(12) United States Patent
Lee

(10) Patent No.: US 8,121,551 B2
(45) Date of Patent: Feb. 21, 2012

(54) GSM MOBILE TERMINAL AND NOISE SUPPRESSION METHOD FOR THE SAME

(75) Inventor: Yong Bok Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 542 days.

(21) Appl. No.: 12/337,243

(22) Filed: Dec. 17, 2008

(65) Prior Publication Data

US 2009/0168743 A1     Jul. 2, 2009

(30) Foreign Application Priority Data

Dec. 28, 2007  (KR) .............................. 2007-0139559

(51) Int. Cl.
*H04B 1/00* (2006.01)
(52) U.S. Cl. ...................... 455/63.1; 341/139; 455/63.35
(58) Field of Classification Search .................. 455/63.1, 455/63.35, 127.2, 9.1, 570, 114.2, 114, 3; 341/155, 144, 139
See application file for complete search history.

(56) References Cited

U.S. PATENT DOCUMENTS

| | | | |
|---|---|---|---|
| 5,287,555 A * | 2/1994 | Wilson et al. .............. | 455/115.1 |
| 7,010,319 B2 * | 3/2006 | Hunzinger .................... | 455/522 |
| 7,181,178 B2 * | 2/2007 | Chow .......................... | 455/127.2 |
| 7,330,739 B2 * | 2/2008 | Somayajula .................. | 455/570 |
| 7,415,254 B2 * | 8/2008 | Kuriyama et al. .......... | 455/127.2 |
| 2003/0026363 A1 * | 2/2003 | Stoter et al. ................... | 375/345 |
| 2006/0046607 A1 * | 3/2006 | Laurienzo et al. ............ | 446/220 |
| 2007/0147554 A1 * | 6/2007 | Yoshida ........................ | 375/345 |
| 2009/0046607 A1 * | 2/2009 | Lee et al. ...................... | 370/294 |

* cited by examiner

*Primary Examiner* — Peguy Jean Pierre

(74) *Attorney, Agent, or Firm* — The Farrell Law Firm, P.C.

(57) ABSTRACT

A TDMA mobile terminal and noise suppression method for the same are provided. The mobile terminal includes a storage unit for storing a gain control table. The gain control table contains gain control values used for controlling gains of at least one of an outgoing audio signal and an incoming audio signal in order to suppress frequency dependent noise in the at least one signal. The mobile terminal also includes an audio processing unit for processing an audio signal by amplifying the audio signal according to applied gain control values. The mobile terminal further includes a control unit for measuring, during call processing, at least one of a transmit power level and a receive power level, determining corresponding gain control values from the gain control table, and applying the determined gain control values to the audio processing unit.

5 Claims, 6 Drawing Sheets

FIG. 4

| TRANSMIT POWER LEVEL | RECEIVE POWER LEVEL | TRANSMIT-POWER FREQUENCY (217Hz) | RECEIVE-POWER FREQUENCY (434Hz) | TRANSMIT-POWER FREQUENCY (217Hz) | RECEIVE-POWER FREQUENCY (434Hz) |
|---|---|---|---|---|---|
| 0 | > -95 | -10dB | -5dB | -10dB | -5dB |
|   | -95 < RX < -85 | -10dB | -5dB | -10dB | -5dB |
|   | -85 < RX < -75 | -10dB | -5dB | -10dB | -5dB |
| 1 | < -95 | -7dB | -3dB | -7dB | -3dB |
|   | -95 < RX < -85 | -7dB | -3dB | -7dB | -3dB |
|   | -85 < RX < -75 | — | — | — | — |
| ... | ... | ... | ... | ... | ... |
| 10 |   |   |   |   |   |

GSM MOBILE TERMINAL AND NOISE SUPPRESSION METHOD FOR THE SAME

PRIORITY

This application claims priority under 35 U.S.C. §119(a) to an application entitled "GSM MOBILE TERMINAL AND NOISE SUPPRESSION METHOD FOR THE SAME" filed in the Korean Intellectual Property Office on Dec. 28, 2007 and assigned Serial No. 2007-0139559, the contents of which are incorporated herein by reference.

BACKGROUND OF THE INVENTION

1. Field of the Invention

The present invention relates generally to noise suppression in a GSM mobile terminal and, more particularly, to a Global System for Mobile communication (GSM) mobile terminal and noise suppression method for the same for suppressing Time Division Multiple Access (TDMA) noise in an audio signal during call processing.

2. Description of the Related Art

GSM is currently the most popular standard for digital mobile terminals. Several GSM users are capable of sharing the same channel to send compressed digital data, and the channel is divided into time slots, each of which is assigned to a user. GSM mobile terminals operate at frequency bands of 900 MHz and 1800 MHz.

GSM has over 120,000,000 users, and is utilized in 120 countries. Many GSM network operators have made international roaming agreements, allowing users to carry their own mobile terminals while traveling in foreign countries.

A GSM mobile terminal employs a TDMA channel access scheme, in which a transmit interval for data transmission and a receive interval for data reception alternate with each other. There is a significant difference between the amount of power consumption in the transmit interval and that in the receive interval. Power consumption in the transmit interval is much higher than that in the receive interval, which gives rise to TDMA noise of a particular frequency. A capacitor connected to the power terminal can be effective for TDMA noise suppression. However, the capacitor may not be sufficient in suppressing the noise, and development of a more effective technique for TDMA noise suppression is necessary.

SUMMARY OF THE INVENTION

The present invention has been made to address at least the above problems and/or disadvantages and to provide at least the advantages described below. Accordingly, an aspect of the present invention provides a GSM mobile terminal and noise suppression method for the same that, in order to suppress TDMA noise in an audio signal during call processing, measures the transmit power level and receive power level, searches a gain control table for frequency dependent amplification gains associated with the measured transmit power level and receive power level, and amplifies the audio signal on the basis of the found frequency dependent amplification gains to effectively control the frequency bands related to TDMA noise generation.

According to one aspect of the present invention, a mobile terminal employing TDMA is provided. The mobile terminal includes a storage unit for storing a gain control table. The gain control table contains gain control values used for controlling gains of at least one of an outgoing audio signal and an incoming audio signal to suppress frequency dependent noise in the at least one signal. The mobile terminal also includes an audio processing unit for processing the at least one audio signal by amplifying the at least one audio signal according to applied gain control values. The mobile terminal further includes a control unit for measuring, during call processing, at least one of a transmit power level and a receive power level, determining corresponding gain control values from the gain control table, and applying the determined gain control values to the audio processing unit. The gain control table may contain distinct gain control values that correspond to transmit-power frequencies or receive-power frequencies related to at least one of transmit power levels and receive power levels. The audio processing unit may include a first filter and a second filter applying the determined gain control values. The first filter and the second filter may perform gain control according to preset frequencies.

According to another aspect of the present invention, a noise suppression method for a TDMA mobile terminal is provided. At least one of a transmit power level and a receive power level of the mobile terminal is measured. A gain control table is searched for frequency dependent gain control values associated with the measured at least one power level. An audio signal is amplified in a frequency dependent manner through application of the found frequency dependent gain control values. The gain control table may contain distinct gain control values to suppress frequency dependent noise in at least one of an outgoing audio signal and an incoming audio signal, and the gain control values correspond to transmit-power frequencies or receive-power frequencies related to at least one of transmit power levels and receive power levels. The noise suppression method may further include setting a mode for noise suppression.

In an embodiment of the present invention, the transmit power level and receive power level are measured during call processing, and the audio signal is amplified on the basis of frequency dependent amplification gains associated with the measured transmit power level and receive power level. Hence, the frequency bands related to TDMA noise generation are efficiently controlled, thereby effectively suppressing TDMA noise.

BRIEF DESCRIPTION OF THE DRAWINGS

The above and other aspects, features and advantages of the present invention will be more apparent from the following detailed description when taken in conjunction with the accompanying drawings, in which:

FIG. 4 is a table of frequency dependent amplification gains used by the mobile terminal of FIG. 3 according to an embodiment of the present invention;

DETAILED DESCRIPTION OF PREFERRED EMBODIMENTS

Preferred embodiments of the present invention are described in detail with reference to the accompanying drawings. The same or similar reference symbols are used throughout the drawings to refer to the same or similar components. Detailed descriptions of constructions or processes known in the art may be omitted to avoid obscuring the subject matter of the present invention.

The mobile terminal of the present invention is a terminal employing the TDMA channel access scheme, and may be a mobile communication terminal, Personal Digital Assistant (PDA), smart phone, International Mobile Telecommunications 2000 (IMT 2000) terminal, or Universal Mobile Telecommunications System (UMTS) terminal.

A transmit-power frequency or receive-power frequency is an integer multiple of a fundamental frequency that corresponds to the repetition period of the transmit interval and receive interval in call processing of a TDMA mobile terminal.

Figure 1:
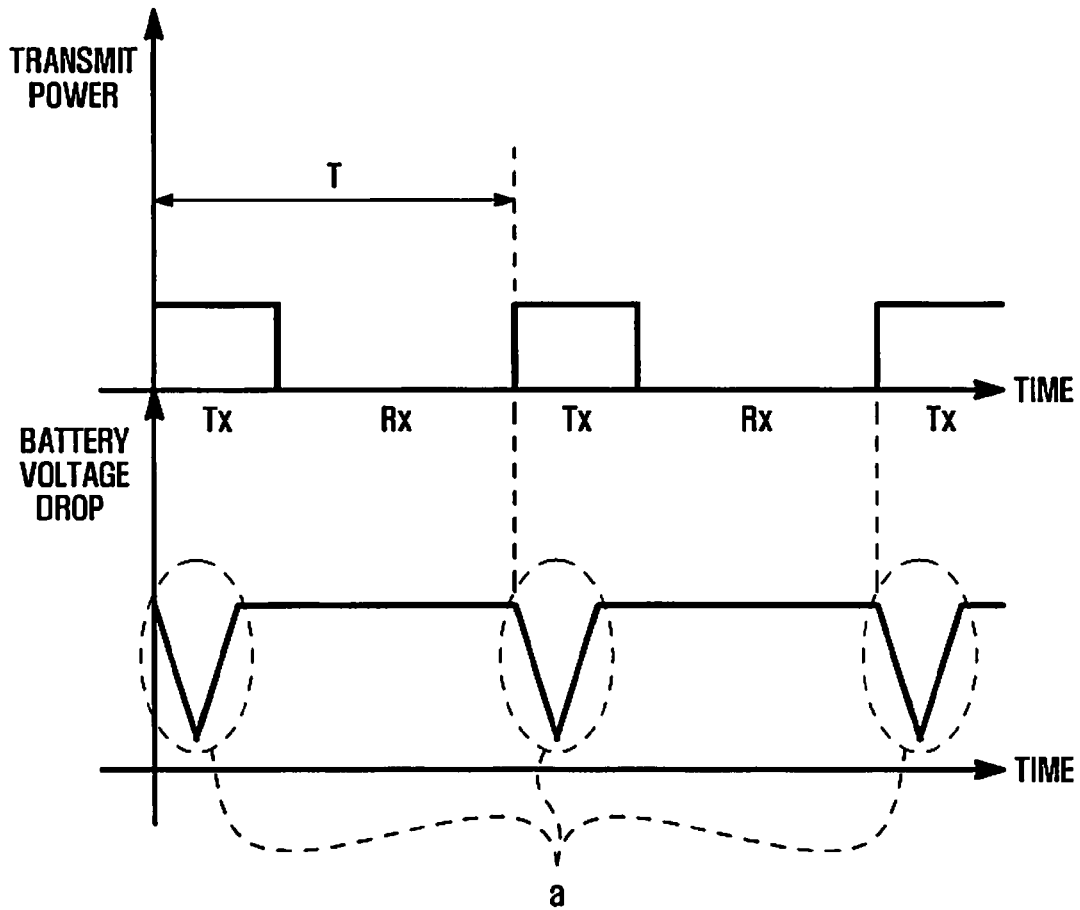
FIG. 1 is a diagram illustrating generation of TDMA noise in a GSM mobile terminal.

FIG. 1 illustrates generation of TDMA noise in a GSM mobile terminal.

The mobile terminal uses a TDMA scheme to communicate with a base station. The mobile terminal sends data to the base station during a transmit interval Tx of a preset period T, and receives data from the base station during a receive interval Rx of the period T. The period T is about 4.6 ms. As shown in FIG. 1, the level of transmit power consumed for sending data in the transmit interval Tx is higher than that of receive power consumed for receiving data in the receive interval Rx. Electric current drawn by the high transmit power level results in a voltage drop due to electric resistance of devices in the mobile terminal. A reference symbol 'a' indicates voltage drops. TDMA noise is caused by these voltage drops.

Figure 2:
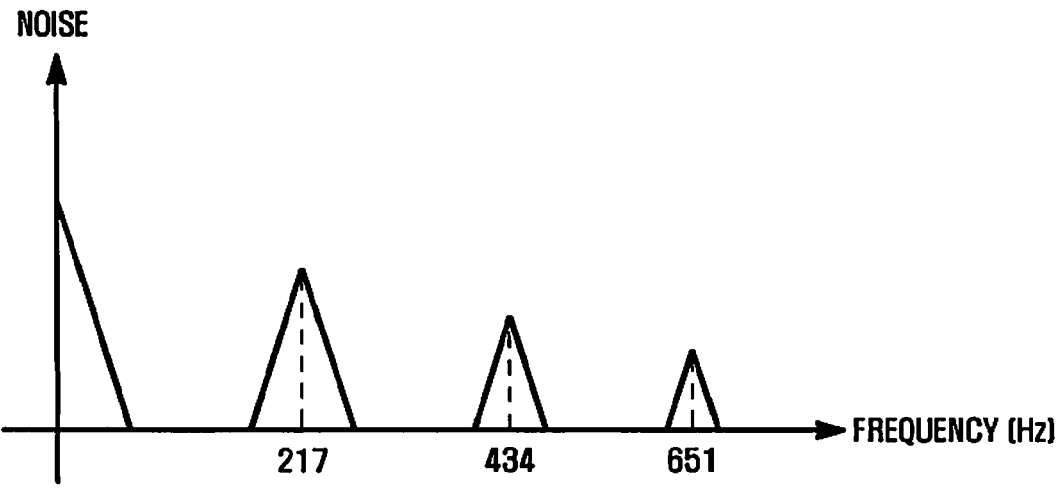
FIG. 2 is a diagram illustrating frequency components of TDMA noise associated with periodic voltage drops depicted in FIG. 1.

FIG. 2 illustrates frequency components of TDMA noise associated with periodic voltage drops depicted in FIG. 1.

In the GSM system, one frame is divided into 8 time slots. The duration of a time slot, which includes one transmit interval and one receive interval, is the period T of about 4.6 ms, which corresponds to a frequency of 217 Hz. In the mobile terminal, noise having component frequencies of multiples of 217 Hz is generated whenever transmit power is applied to send data. As shown in FIG. 2, noise having component frequencies of 217 Hz, 434 Hz, 651 Hz, 868 Hz and the like are generated, and this noise is referred to as TDMA noise. TDMA noise has known component frequencies. Frequency bands related to TDMA noise are distinguished from those unrelated to TDMA noise, a table of frequency dependent gain control values is created, gain control values are found from the table, and the gain control values are applied to the audio signal. The frequency bands of the audio signal related to TDMA noise are controlled to thereby effectively suppress TDMA noise.

Figure 3:
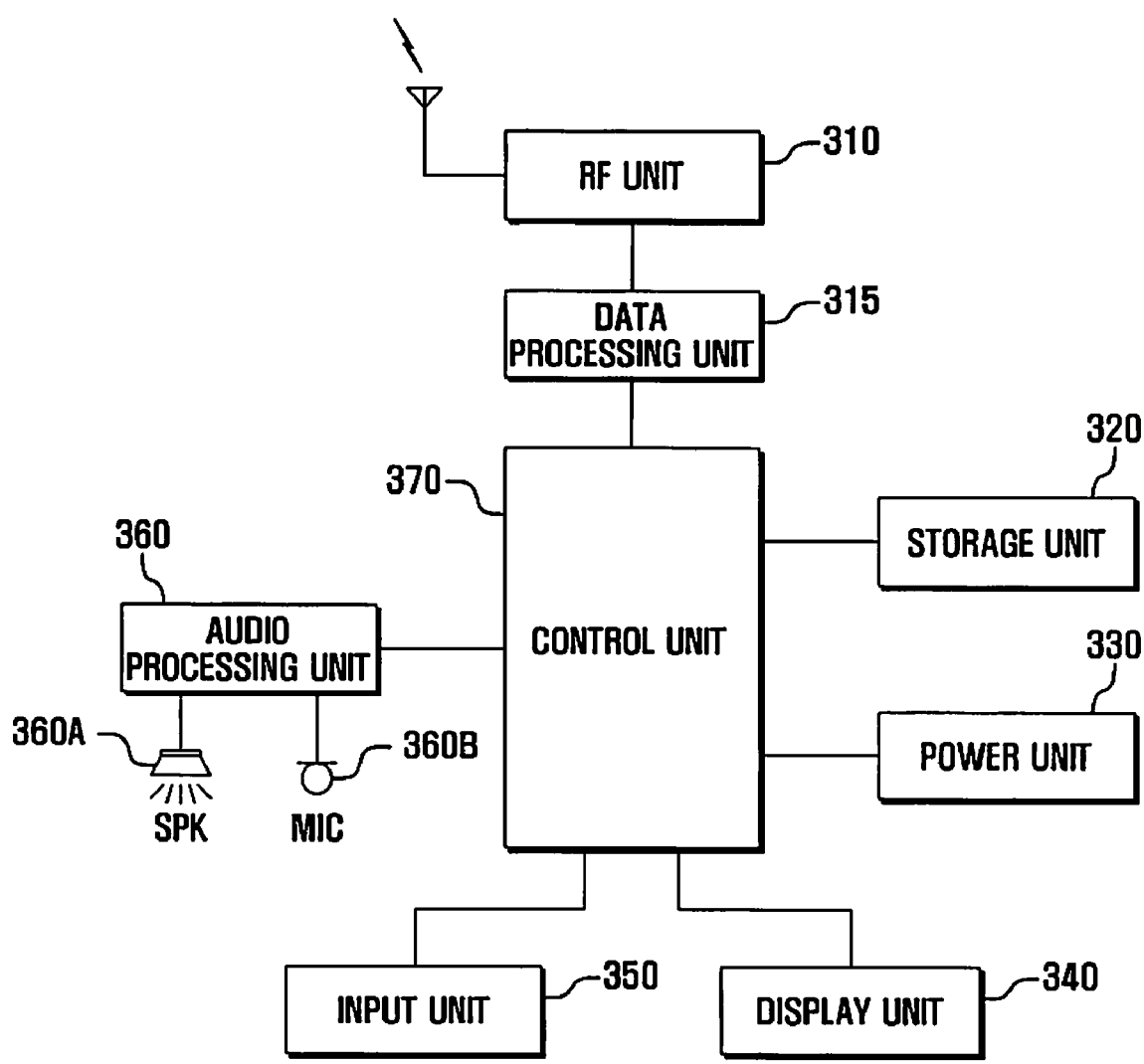
FIG. 3 is a block diagram illustrating a mobile terminal with a TDMA noise suppression capability according to an embodiment of the present invention.

FIG. 3 is a block diagram illustrating a mobile terminal with a TDMA noise suppression capability according to an embodiment of the present invention. Referring to FIG. 3, the mobile terminal includes a Radio Frequency (RF) unit 310, a data processing unit 315, a storage unit 320, a power unit 330, a display unit 340, an input unit 350, an audio processing unit 360, and a control unit 370.

The RF unit 310 performs communication operations related to calls, short messages, multimedia messages, and data services. The RF unit 310 may include an RF transmitter for upconverting the frequency of a signal to be transmitted and amplifying the signal, and an RF receiver for low-noise amplifying a received signal and downconverting the frequency of the received signal.

The data processing unit 315 converts voice or acoustic data and control data into RF signals, and converts RF signals into voice or acoustic data and control data.

The storage unit 320 stores programs and related data necessary for overall operation of the mobile terminal. The storage unit 320 may include a volatile storage such as a Random Access Memory (RAM), and non-volatile storage such as a Read-Only Memory (ROM) or flash memory. In particular, the storage unit 320 stores a gain control table that contains frequency dependent gain control values used to suppress frequency dependent noise in one of an outgoing audio signal and incoming audio signal. Gain control values in the table are related to the transmit power level and receive power level for TDMA noise suppression. For example, as described above, TDMA noise in a mobile terminal has component frequencies of multiples of 217 Hz. The gain control values are set so as to reduce the magnitude of frequency bands with a frequency equal to a multiple of 217 Hz in the audio signal.

A gain control table stored in the storage unit 320 is illustrated in FIG. 4. The values in the gain control table correspond to transmit-power frequencies and receive-power frequencies related to transmit power levels and receive power levels, respectively. Gain control values may be different from each other for transmit-power frequencies and receive-power frequencies that are equal to multiples of the fundamental frequency of 217 Hz in TDMA noise.

For example, when the measured transmit power level is 1 and the measured receive power level is −90, gain control values −7 (dB) and −3 (dB) are assigned to transmit-power frequencies of 217 Hz and 434 Hz, respectively. Gain control values −7 (dB) and −3 (dB) are assigned to receive-power frequencies of 217 Hz and 434 Hz, respectively.

In the gain control table of FIG. 4, gain control values are assigned for both transmit-power frequencies and receive-power frequencies related to transmit power levels and receive power levels. However, the table may be designed to contain gain control values only for transmit-power frequencies related to transmit power levels, or only for receive-power frequencies related to receive power levels.

The power unit 330 supplies power to each element of the mobile terminal.

The display unit 340 may include a panel of Liquid Crystal Display (LCD) devices, and displays various visual data generated by the mobile terminal and operation states thereof. In particular, the display unit 340 can display a menu for setting a TDMA noise suppression mode.

The input unit 350 may include a keypad, touch screen, or touch pad, and is used by the user to issue a command or to obtain desired information. In particular, the input unit 350 can be used to set the TDMA noise suppression mode.

The audio processing unit 360 includes a vocoder, and converts an audio signal from a microphone MIC 360B into an electrical signal and outputs the electrical signal to the RF unit 310. The audio processing unit 360 converts an electrical signal from the RF unit 310 into an audio signal and outputs the audio signal to a speaker SPK 360A. Particularly, in audio signal processing, the audio processing unit 360 amplifies the audio signal according to gain control information from the control unit 370. Audio signal processing is performed using frequency dependent gain control values to minimize the impact of TDMA noise.

The control unit 370 controls the overall operation of the mobile terminal. In particular, when the TDMA noise suppression mode is set and a call is in progress, the control unit 370 measures the transmit power level and receive power level, searches the gain control table for frequency dependent gain control values associated with the measured transmit power level and receive power level, and controls the audio processing unit 360 to amplify the audio signal with reference to the found gain control values for TDMA noise suppression.

In the description above, frequency dependent gain control values are found from the gain control table on the basis of both the transmit power level and receive power level. However, frequency dependent gain control values may also be found on the basis of one of the transmit power level and receive power level.

Figure 5:
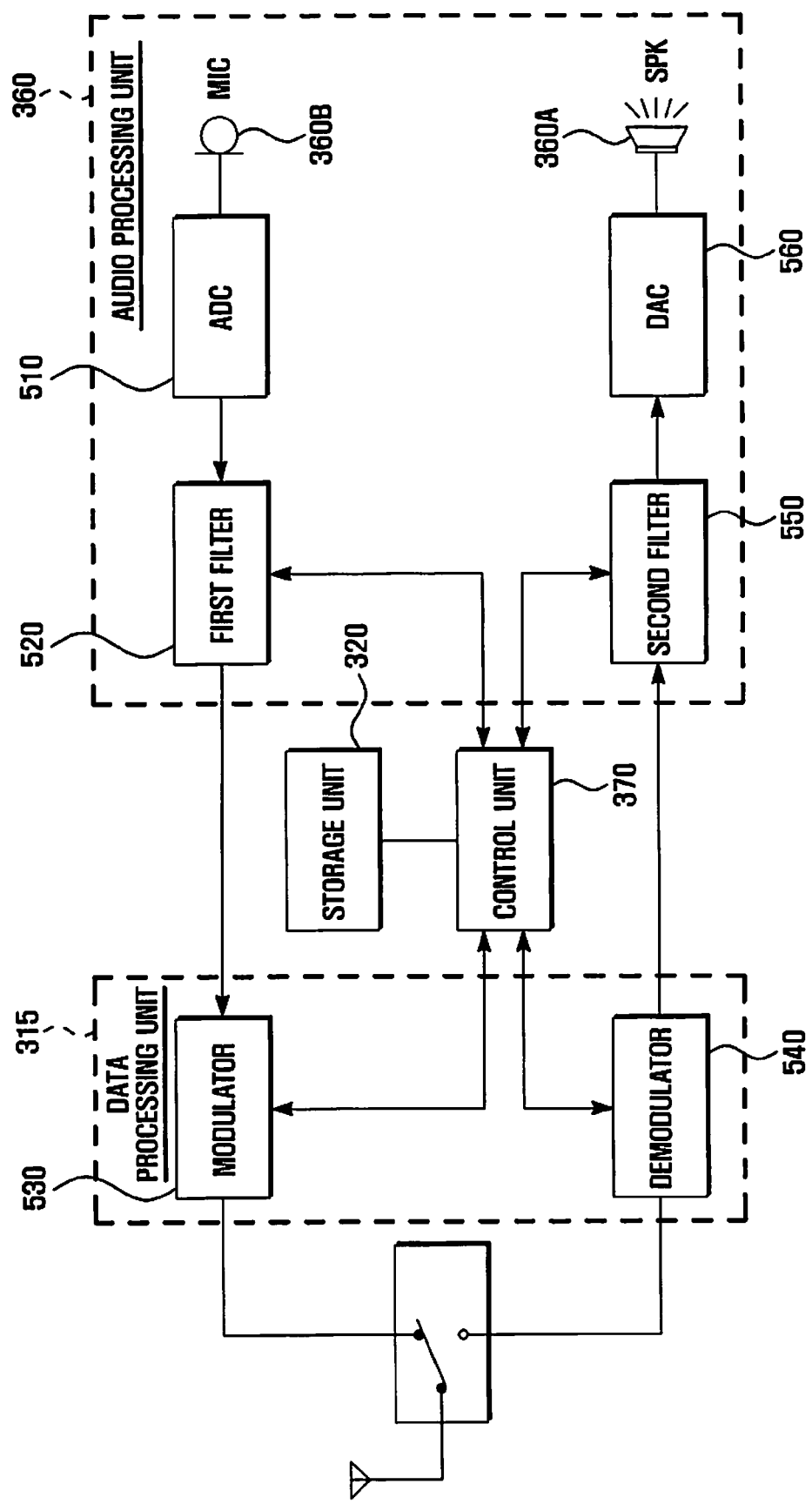
FIG. 5 is a diagram illustrating interactions between a data processing unit, storage unit, audio processing unit, and control unit of the mobile terminal to control the audio signal using the table of FIG. 4 according to an embodiment of the present invention.

FIG. 5 illustrates interactions between a data processing unit 315, storage unit 320, audio processing unit 360, and control unit 370 of the mobile terminal to control the audio signal using the gain control table. The data processing unit 315 can include a modulator 530 and a demodulator 540. The audio processing unit 360 can include the microphone 360A, an analog-to-digital converter 510, a first filter 520, a second filter 550, a digital-to-analog converter 560, and the speaker 360B.

To suppress noise in an outgoing signal, when a call is established, a voice signal of the user input to the microphone 360A is converted by the analog-to-digital converter 510 to a digital signal. At the same time, the control unit 370 measures the transmit power level and receive power level, and searches the gain control table stored in the storage unit 320 for frequency dependent gain control values associated with the measured transmit power level and receive power level. Then, the control unit 370 applies the frequency dependent gain control values through the first filter 520 to the digital signal for noise suppression. The first filter 520 performs frequency dependent gain control. The noise-filtered digital signal is modulated through the modulator 530, and the modulated signal is transmitted to a corresponding base station.

To suppress noise in an incoming signal, an RF signal from the base station is received by the RF unit 310, and the RF signal is demodulated through the demodulator 540 into a digital signal. At the same time, the control unit 370 measures the transmit power level and receive power level, and searches the gain control table stored in the storage unit 320 for frequency dependent gain control values associated with the measured transmit power level and receive power level. Then, the control unit 370 applies the frequency dependent gain control values through the second filter 550 to the digital signal for noise suppression. The second filter 550 performs frequency dependent gain control. The noise-filtered digital signal is converted by the digital-to-analog converter 560 into an analog signal, and the analog signal is reproduced through the speaker 360B.

Figure 6:
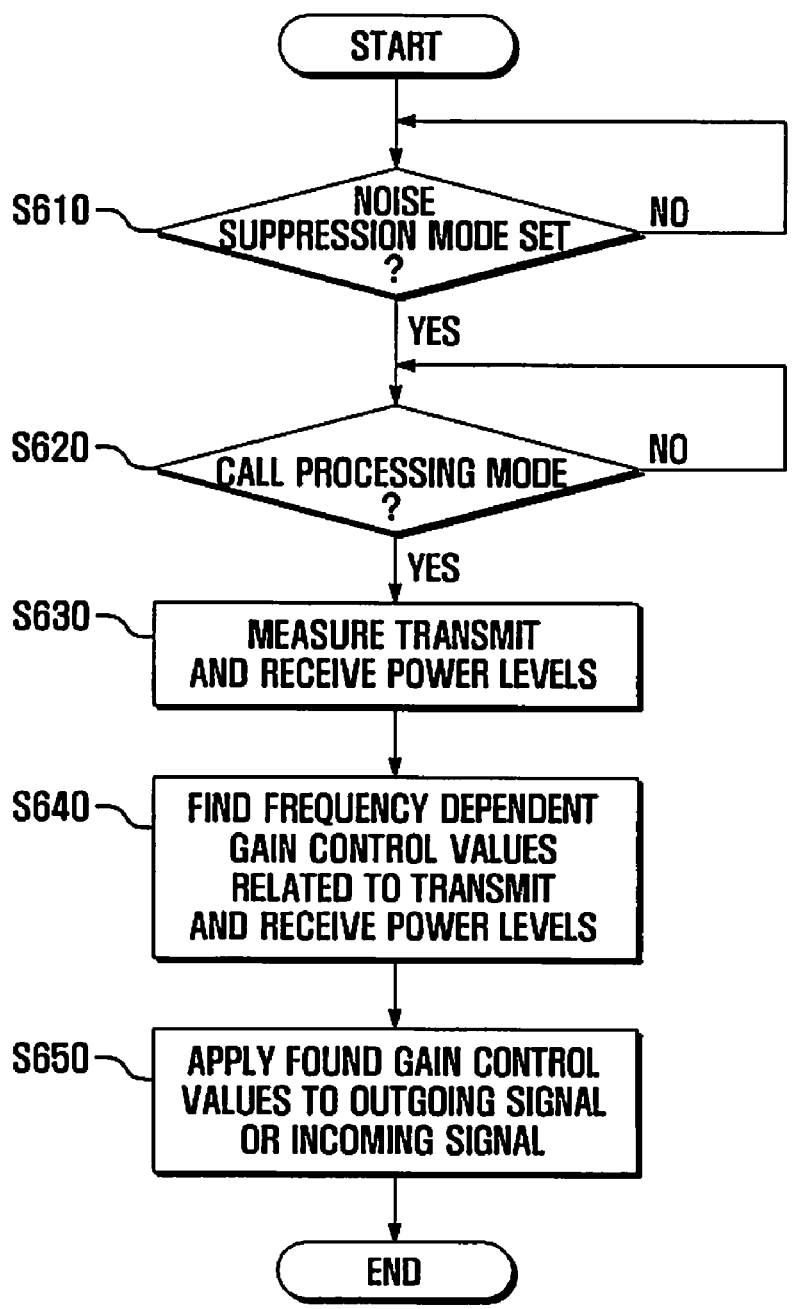
FIG. 6 is a flow chart illustrating a TDMA noise suppression method for the mobile terminal according to another embodiment of the present invention.

FIG. 6 is a flow chart illustrating a TDMA noise suppression method for the mobile terminal according to another embodiment of the present invention.

Figure 7:
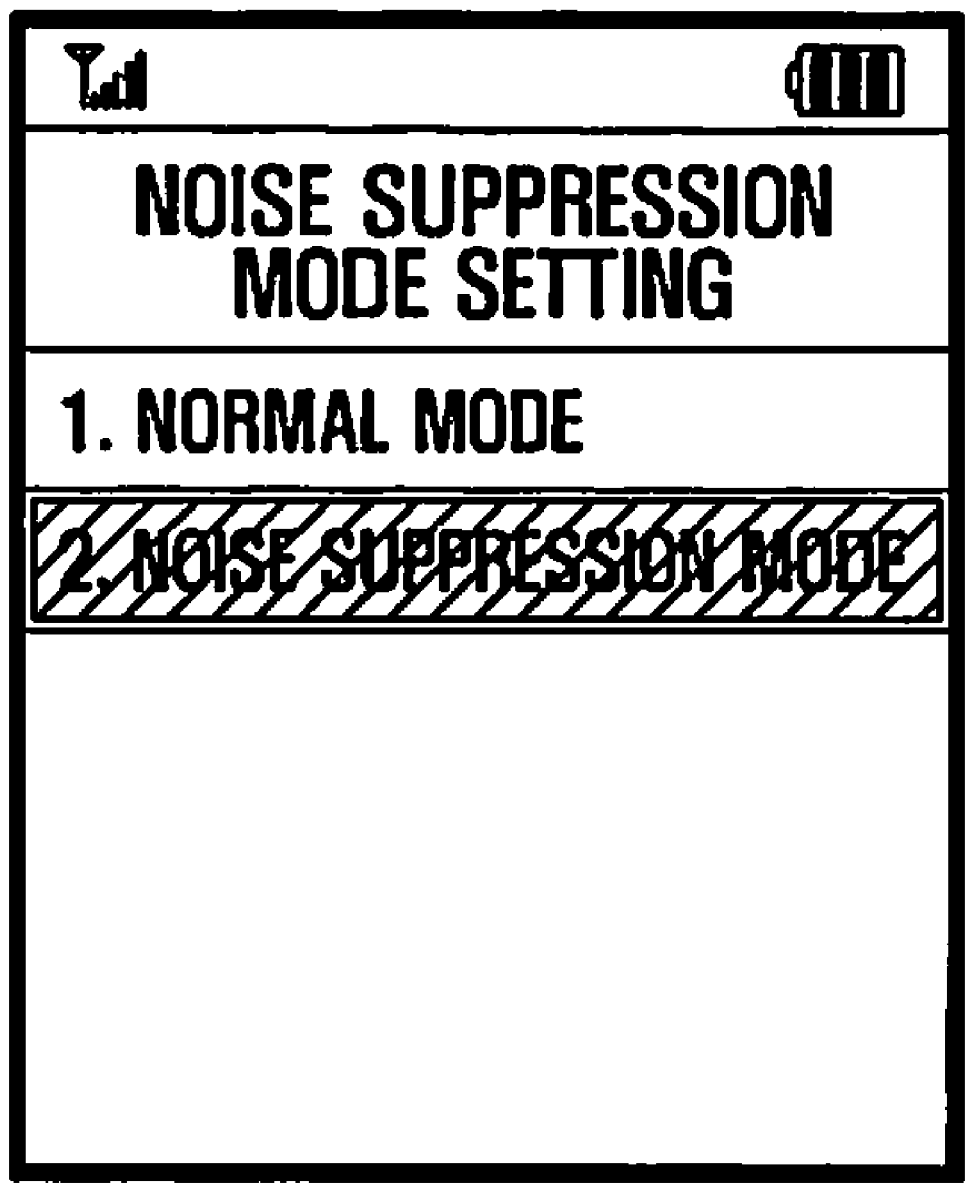
FIG. 7 is a screen representation for setting a TDMA noise suppression mode in the mobile terminal according to an embodiment of the present invention.

Referring to FIG. 6, the control unit 370 determines whether the noise suppression mode is set in step S610. In the noise suppression mode, frequency dependent gain control values found in the gain control table are applied to the audio processing unit 360 for amplification with a view to TDMA noise suppression. The noise suppression mode can be set by selecting an item in the menu screen illustrated in FIG. 7.

If the noise suppression mode is set, the control unit 370 determines whether the mobile terminal is in the call processing mode in step S620. If the mobile terminal is in the call processing mode, the control unit 370 measures the transmit power level and receive power level in step S630. The control unit 370 controls the storage unit 320 to search the stored gain control table for frequency dependent gain control values associated with the measured transmit power level and receive power level in step S640. The control unit 370 applies the found frequency dependent gain control values to the outgoing signal or incoming signal for TDMA noise suppression in step S650.

In the description of the method, frequency dependent gain control values are found from the gain control table on the basis of both the transmit power level and receive power level of an audio signal. However, frequency dependent gain control values may also be found on the basis of one of the transmit power level and receive power level.

While the invention has been shown and described with reference to certain preferred embodiments thereof, it will be understood by those skilled in the art that many changes in form and details may be made therein without departing from the spirit and scope of the invention as defined by the appended claims.

What is claimed is:

1. A mobile terminal employing Time Division Multiple Access (TDMA), comprising:
    a storage unit for storing a gain control table, wherein the gain control table includes distinct gain control values used for controlling gains of at least one of an outgoing audio signal and an incoming audio signal in order to suppress frequency dependent noise in the at least one audio signal;
    an audio processing unit for processing the at least one audio signal by amplifying the at least one audio signal according to applied gain control values; and
    a control unit for measuring, during call processing, at least one of a transmit power level and a receive power level, determining corresponding gain control values from the gain control table, and applying the determined gain control values to the audio processing unit,
    wherein the distinct gain control values in the gain control table correspond to transmit-power frequencies or receive-power frequencies related to at least one of transmit power levels and receive power levels; and
    wherein the transmit-power frequencies or receive-power frequencies are an integer multiple of a fundamental frequency that corresponds to one repetition period of data transmission and reception.

2. The mobile terminal of claim 1, wherein the audio processing unit comprises a first filter and a second filter applying the determined gain control values.

3. The mobile terminal of claim 2, wherein the first filter and the second filter perform gain control according to preset frequencies.

4. A noise suppression method for a mobile terminal employing Time Division Multiple Access (TDMA), comprising the steps of:
    measuring at least one of a transmit power level and a receive power level of the mobile terminal;
    searching a gain control table for frequency dependent gain control values associated with the measured at least one power level; and
    amplifying an audio signal in a frequency dependent manner through application of the frequency dependent gain control values,
    wherein the gain control table includes distinct gain control values for suppressing frequency dependent noise in at least one of an outgoing audio signal and an incoming audio signal, and the distinct gain control values correspond to transmit-power frequencies or receive-power frequencies related to at least one of transmit power levels and receive power levels; and
    wherein the transmit-power frequencies or receive-power frequencies are an integer multiple of a fundamental frequency that corresponds to one repetition period of data transmission and reception.

5. The noise suppression method of claim 4, further comprising setting a mode for noise suppression.

* * * * *